(12) United States Patent
Choi et al.

(10) Patent No.: US 12,269,478 B2
(45) Date of Patent: Apr. 8, 2025

(54) METHOD OF ESTIMATING MAXIMUM ROAD FRICTION COEFFICIENT

(71) Applicants: Hyundai Motor Company, Seoul (KR); Kia Corporation, Seoul (KR); Korea University of Technology and Education Industry-University Cooperation Foundation, Cheonan-si (KR)

(72) Inventors: Hae Ryong Choi, Seoul (KR); Dong Yoon Hyun, Seoul (KR); Seung Han You, Seoul (KR)

(73) Assignees: Hyundai Motor Company, Seoul (KR); Kia Corporation, Seoul (KR); Korea University of Technology and Education Industry-University Cooperation Foundation, Cheonan-si (KR)

( * ) Notice: Subject to any disclaimer, the term of this patent is extended or adjusted under 35 U.S.C. 154(b) by 529 days.

(21) Appl. No.: 17/492,919

(22) Filed: Oct. 4, 2021

(65) Prior Publication Data
US 2022/0185293 A1    Jun. 16, 2022

(30) Foreign Application Priority Data

Dec. 16, 2020 (KR) .......... 10-2020-0176152

(51) Int. Cl.
*B60W 40/068* (2012.01)
*B60W 10/18* (2012.01)
(Continued)

(52) U.S. Cl.
CPC .......... *B60W 40/068* (2013.01); *B60W 10/18* (2013.01); *B60W 40/107* (2013.01);
(Continued)

(58) Field of Classification Search
CPC .............. B60W 40/068; B60W 10/18; B60W 40/107; B60W 40/109; B60W 40/114; B60W 2520/14; B60W 2520/263; B60W 2520/28; B60W 2520/30; B60W 2540/18; B60W 2552/40; B60W 2710/18;
(Continued)

(56) References Cited

U.S. PATENT DOCUMENTS

2003/0163237 A1* 8/2003 Kim ...................... B60T 8/1769
701/80
2008/0262692 A1* 10/2008 Kogure ............... B60W 40/068
701/90

FOREIGN PATENT DOCUMENTS

CN    101524994    * 9/2009    .......... B60T 8/17558
CN    106232438    * 12/2016    ............ B60T 8/4827
(Continued)

OTHER PUBLICATIONS

JP-2002154418-A Patentscope Translation (Year: 2002).*
(Continued)

*Primary Examiner* — Joan T Goodbody
(74) *Attorney, Agent, or Firm* — Morgan, Lewis & Bockius LLP

(57) ABSTRACT

According to the method of estimating a maximum road friction coefficient, artificial braking or driving-related control is conducted and a maximum road friction coefficient is estimated based on a difference in wheel speeds between front and rear wheels, compensated for slip of tires.

17 Claims, 8 Drawing Sheets

(51) Int. Cl.
  *B60W 40/107* (2012.01)
  *B60W 40/109* (2012.01)
  *B60W 40/114* (2012.01)

(52) U.S. Cl.
  CPC ........ *B60W 40/109* (2013.01); *B60W 40/114* (2013.01); *B60W 2520/14* (2013.01); *B60W 2520/263* (2013.01); *B60W 2520/28* (2013.01); *B60W 2520/30* (2013.01); *B60W 2540/18* (2013.01); *B60W 2552/40* (2020.02); *B60W 2710/18* (2013.01)

(58) Field of Classification Search
  CPC .... B60W 10/04; B60W 10/14; B60W 10/119; B60W 40/10; B60W 40/12; B60W 50/10; B60W 2520/105; B60W 2520/125; B60W 2520/26; B60W 2530/10; B60W 2720/30
  See application file for complete search history.

(56) References Cited

FOREIGN PATENT DOCUMENTS

| | | | | |
|---|---|---|---|---|
| JP | 2002154418 | * | 5/2002 | ............. B60T 8/172 |
| JP | 2002154418 A | * | 5/2002 | ............. B60T 8/172 |
| JP | 2002211378 | * | 8/2007 | ............. B60W 40/11 |
| JP | 2007190942 | * | 8/2007 | ............. B60W 30/02 |
| JP | 2008144788 | * | 6/2008 | ............. F16H 48/06 |
| JP | 2012153290 | * | 8/2012 | ......... B60W 40/068 |
| KR | 20140021744 | * | 2/2014 | ......... B60W 40/105 |
| KR | R 20140021744 | * | 2/2014 | ......... B60W 40/105 |

OTHER PUBLICATIONS

KR-20140021744-A Test (Year: 2014).*
KR20140021744 Patentscope translation (Year: 2014).*
CN_101524994 merged image and translation (Year: 2009).*
JP_2002211378 merged image and translation (Year: 2002).*
JP_2007190942_merged image and translation (Year: 2007).*
JP_2008144788 merged image and translation (Year: 2008).*
JP 2002154418 merged image and translation (Year 2002) Replacement for previous translation. (Year: 2002).*
KR_20140021744 English translation from Patentscope (Year: 2014).*
JP_2002154418 English translation (Year: 2002).*
CN_106232438 English Translation (Year: 2009).*
Jin-Oh Hahn, R. Rajamani and L. Alexander, "GPS-based real-time identification of tire-road friction coefficient," in IEEE Transactions on Control Systems Technology, vol. 10, No. 3, pp. 331-343, May 2002, doi:10.1109/87.998016.
V. V. Viikari, T. Varpula and M. Kantanen, "Road-Condition Recognition Using 24-GHz Automotive Radar," in IEEE Transactions on Intelligent Transportation Systems, vol. 10, No. 4, pp. 639-648, Dec. 2009, doi: 10.1109/TITS.2009.2026307.
M. Kutila, P. Pyykφnen, K. Kauvo and p. Eloranta, "In-vehicle sensor data fusion for road friction monitoring," 2011 IEEE 7th International Conference on Intelligent Computer Communication and Processing, Cluj-Napoca, 2011, pp. 349-352, doi: 10.1109/ICCP.2011.6047895.
Acosta, M.; Kanarachos, S.; Blundell, M. Road Friction Virtual Sensing: A Review of Estimation Techniques with Emphasis on Low Excitation Approaches. Appl. Sci. 2017, 7, 1230.

* cited by examiner

[ DIFFERENCE IN WHEEL SPEED BETWEEN FRONT AND REAR WHEELS (SLIP RATE) ]

METHOD OF ESTIMATING MAXIMUM ROAD FRICTION COEFFICIENT

CROSS-REFERENCE TO RELATED APPLICATION

The present application claims priority to Korean Patent Application No. 10-2020-0176152, filed Dec. 16, 2020, the entire contents of which is incorporated herein for all purposes by this reference.

BACKGROUND OF THE INVENTION

Field of the Invention

The present invention relates to a method of estimating a maximum road friction coefficient. In particular, according to the method of estimating a maximum road friction coefficient, artificial braking or driving-related control is conducted and a maximum road friction coefficient is estimated with enhanced sensitivity based on a difference in wheel speeds between front and rear wheels, compensated for slip of tires.

Description of Related art

As a road friction coefficient is used to determine maximum acceleration or deceleration in longitudinal and lateral motion of a vehicle, it is critical to estimate the road friction coefficient in terms of vehicle stability control. When a maximum friction coefficient between a tire and a road is known, maximum longitudinal and lateral forces that a vehicle can output may be determined in advance. Accordingly, if it is possible to estimate the maximum road friction coefficient, a vehicle control system, such as an advanced driver assistance system (ADAS), may be further improved.

A lot of research has been conducted on estimation of the maximum road friction coefficient. However, since there are certain difficulties and limitations in deriving values reliable for various situations, research in this field is still actively conducted.

The foregoing is intended merely to aid in the understanding of the background of the present invention, and is not intended to mean that the present invention falls within the purview of the related art which is already known to those skilled in the art.

The information disclosed in this Background of the present invention section is only for enhancement of understanding of the general background of the present invention and may not be taken as an acknowledgement or any form of suggestion that this information forms the prior art already known to a person skilled in the art.

BRIEF SUMMARY

Various aspects of the present invention are directed to providing a method of estimating a maximum road friction coefficient for providing a reliable maximum road friction coefficient.

The objects of the present invention are not limited to those described above, and other unmentioned objects of the present invention will be clearly understood by a person of ordinary skill in the art from the following description.

The features of the present invention to accomplish the object of the present invention and to perform characteristic functions of the present invention, a description of which will follow, are as follows.

According to various exemplary embodiments of the present invention, a method of estimating a maximum road friction coefficient includes: collecting, by a processor, operation information related to a vehicle; differentially controlling, by the processor, at least one of driving torque and braking torque of a front wheel and a rear wheel of the vehicle within a range of a driving request, a braking request, or a request to maintain a constant speed of the vehicle for estimating the maximum road friction coefficient; compensating, by the processor, slip due to tire force in the front wheel and the rear wheel; determining, by the processor, a wheel speed difference ratio of the front wheel and the rear wheel based on speed of the front wheel and speed of the rear wheel where the slip due to tire force is compensated; and estimating the maximum road friction coefficient based on the wheel speed difference ratio and a current road friction coefficient of each wheel including the front wheel and the rear wheel.

Other aspects and exemplary embodiments of the present invention are discussed infra.

The above and other features of the present invention are discussed infra.

It is understood that the term "vehicle" or "vehicular" or other similar term as used herein is inclusive of motor vehicles in general such as passenger vehicles including sports utility vehicles (SUVs), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles, e.g., fuels derived from resources other than petroleum. As referred to herein, a hybrid vehicle is a vehicle that has two or more sources of power, for example both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
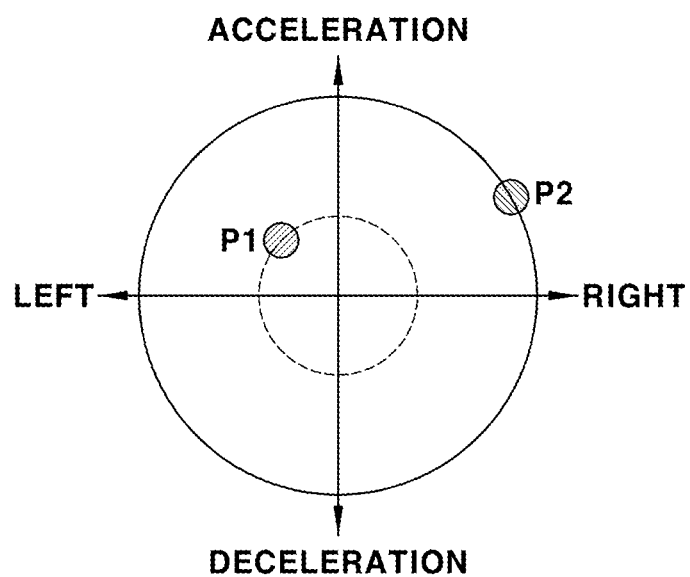
FIG. 1 shows a friction circle of a tire.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Hereinafter, exemplary embodiments of the present invention will be described in detail with reference to the accompanying drawings. Specific structures or functions described in the exemplary embodiments of the present invention are merely for illustrative purposes. Embodiments according to the concept of the present invention may be implemented in various forms, and it may be understood that they may not be construed as being limited to the exemplary embodiments described in the exemplary embodiment, but include all of modifications, equivalents, or substitutes included in the spirit and scope of the present invention.

It will be understood that, although the terms "first," "second," etc., may be used herein to describe various elements, these elements should not be limited by these terms. These terms are only used to distinguish one element from another element. For instance, a first element discussed below could be termed a second element without departing from the teachings of the present invention. Similarly, the second element could also be termed the first element.

It will be understood that when an element is referred to as being "coupled" or "connected" to another element, it may be directly coupled or connected to the other element or intervening elements may be present therebetween. In contrast, it should be understood that when an element is referred to as being "directly coupled" or "directly connected" to another element, there are no intervening elements present. Other expressions that explain the relationship between elements, such as "between," "directly between," "adjacent to," or "directly adjacent to," should be construed in the same way.

Like reference numerals denote like components throughout the specification. In the meantime, the terminology used herein is for describing various exemplary embodiments only and is not intended to be limiting. As used herein, the singular forms "a," "an," and "the" are intended to include the plural forms as well, unless the context clearly indicates otherwise. It will be further understood that the terms "comprise," "include," "have," etc., when used in the present specification, specify the presence of stated components, steps, operations, and/or elements, but do not preclude the presence or addition of one or more other components, steps, operations, and/or elements thereof.

The present invention relates to a method of estimating a maximum road friction coefficient where artificial braking or driving-related control for a traveling vehicle is conducted and the maximum road friction coefficient is estimated based on a difference in wheel speeds between front and rear wheels, the difference in wheel speeds being compensated for slip caused by tire force.

Various aspects of the present invention are directed to providing excellent estimation capability only using sensors of a vehicle. The present invention may utilize torque control of individual wheels provided with in-wheel or by-wire technology.

The present invention can reduce costs since additional sensors, such as a radar, a strain sensor, and a microphone, are not needed.

A maximum tire-road friction coefficient as an estimation target in various exemplary embodiments of the present invention is distinguished from a current or real-time tire-road friction coefficient $\mu_c$. The current road friction coefficient $\mu_c$ may be obtained using Equation (1) below.

$$\mu_c = \frac{a_c}{g} \quad (1)$$

Here, $\alpha_c$ is a current acceleration of the vehicle or a wheel and g is acceleration of gravity.

FIG. 1 shows a friction circle of a tire. For instance, P1 represents the current tire-road friction coefficient $\mu_c$, while P2 indicates a maximum or limiting tire-road friction coefficient $\mu_{peak}$ between a road and the tire. In various exemplary embodiments of the present invention, the friction coefficient to be estimated refers to the latter.

Hereinafter, the present invention will be described in detail with reference to the accompanying drawings.

Figure 2:
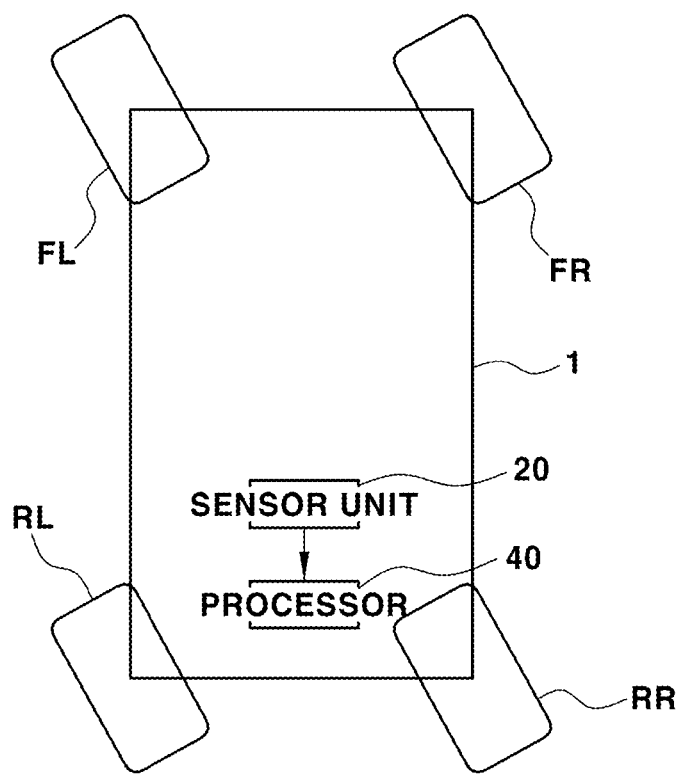
FIG. 2 illustrates a vehicle provided with a vehicle control system.

FIG. 2 illustrates a vehicle 1 including a vehicle control system 100 such as an advanced driver assistance system (ADAS). The vehicle 1 may include front wheels and rear wheels; the front wheels include a front left wheel FL and a front right wheel FR, and the rear wheels include a rear left wheel RL and a rear right wheel RR. The vehicle 1 includes a sensor unit 20 and a processor 40.

The vehicle 1 includes the sensor unit 20 for collecting operation information related to the vehicle 1 for controlling the vehicle 1. The sensor unit 20 may include a wheel speed sensor for measuring the speed of each wheel, a yaw rate sensor for measuring the yaw rate of the vehicle 1, a steering angle sensor for measuring a steering angle of the vehicle 1, a longitudinal acceleration sensor and a lateral acceleration sensor for measuring longitudinal acceleration and lateral acceleration of the vehicle 1, and a torque sensor for measuring torque of each wheel. The sensor unit 20 may detect a control signal of an electronic stability control (ESC) device, an anti-lock brake system (ABS), or a traction control system (TCS) of the vehicle 1.

Figure 3:
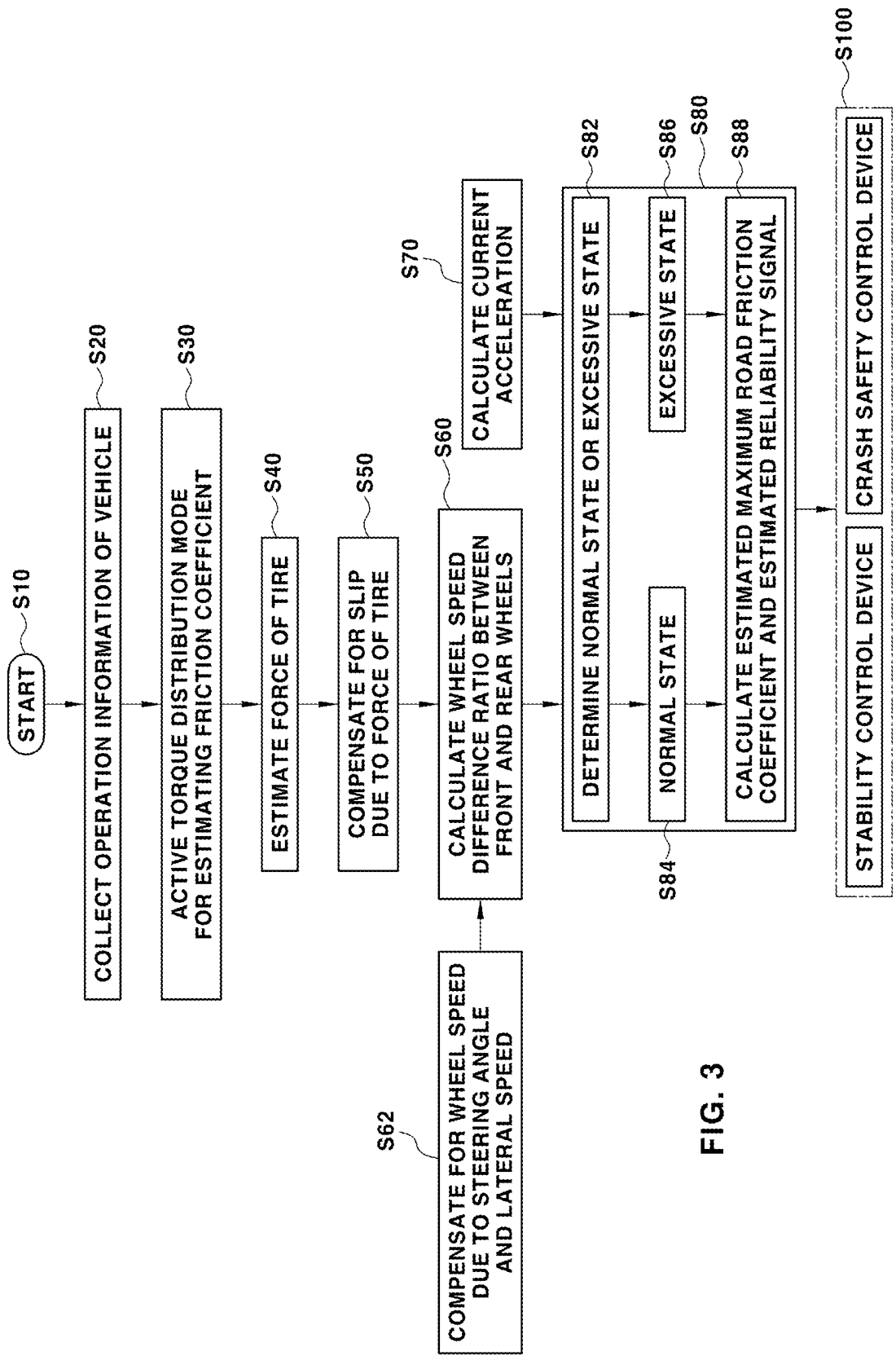
FIG. 3 is a flowchart of a method of estimating a maximum road friction coefficient according to various exemplary embodiments of the present invention.

FIG. 3 illustrates an algorithm of a method of estimating a maximum road friction coefficient according to various exemplary embodiments of the present invention.

Figure 4:
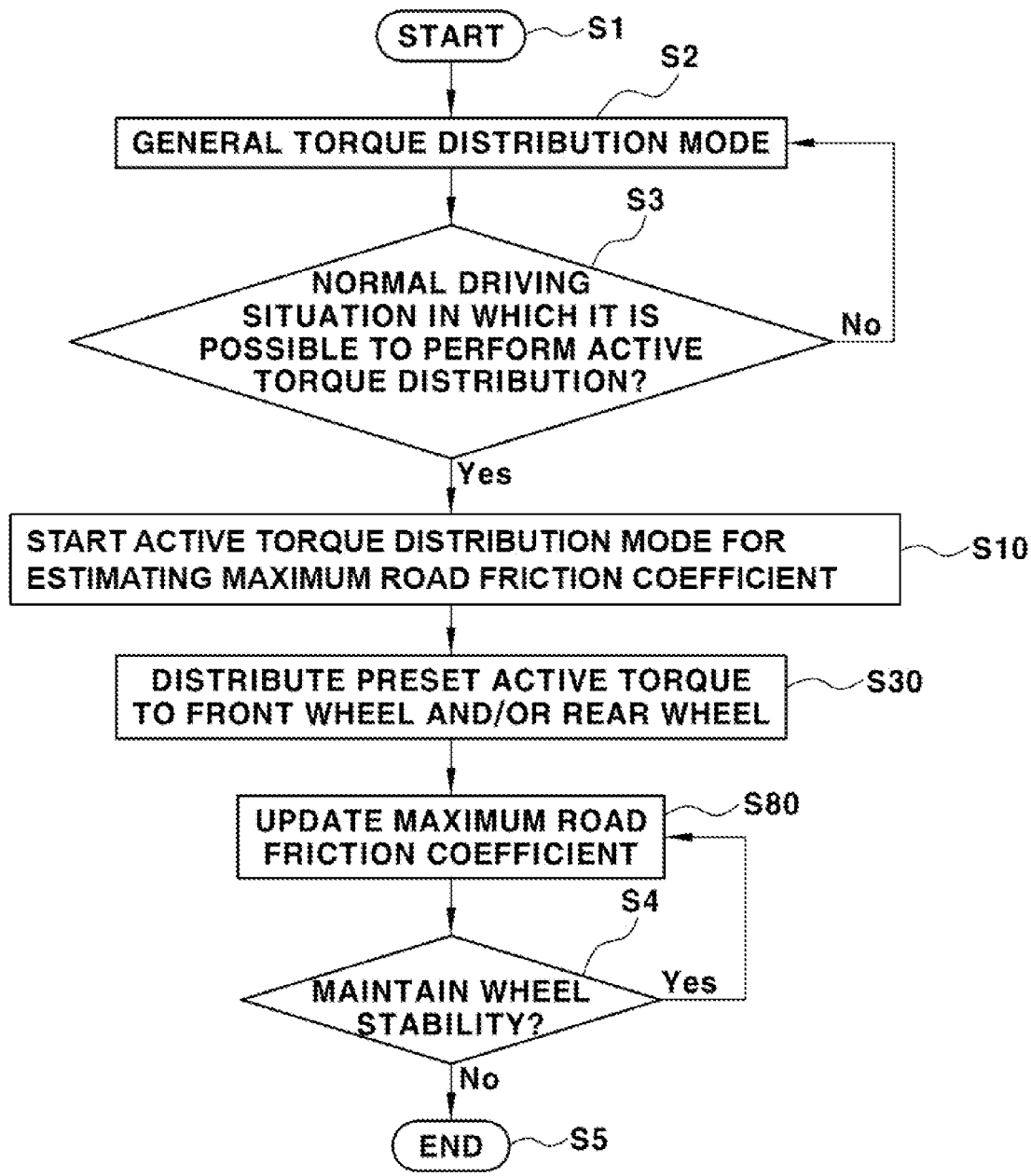
FIG. 4 is a flowchart related to implementation of the method according to various exemplary embodiments of the present invention.

At step S10, estimation of the maximum road friction coefficient is initiated. Referring to FIG. 4, whether active torque distribution for the estimation method according to various exemplary embodiments of the present invention is performed may be determined first. When the vehicle begins to travel (S1), general torque distribution is performed first (S2). The processor 40 may distribute torque to the front wheels or the rear wheels in consideration of stability and efficiency aspects for the vehicle. Then the processor 40 may determine whether the current situation is a normal driving situation where the active torque distribution designed for the estimation method according to various exemplary embodiments of the present invention may be introduced to estimate the maximum road friction coefficient (S3). If the current situation is a normal driving situation and the active torque distribution may be performed, the processor 40 may start the active torque distribution for estimating the maximum road friction coefficient (S10). If it is found that the wheel stability cannot be maintained during the active torque distribution mode, e.g., excessive slippage occurs, the active torque distribution mode may be terminated (S4, S5).

The processor 40 of the vehicle 1 may collect the operation information of the vehicle 1 from the sensor unit 20 (S20). The processor 40 may receive information from the sensor unit 20 about whether a driver is decelerating the vehicle, is accelerating the vehicle, or is driving the vehicle at a constant speed.

Figure 5A:
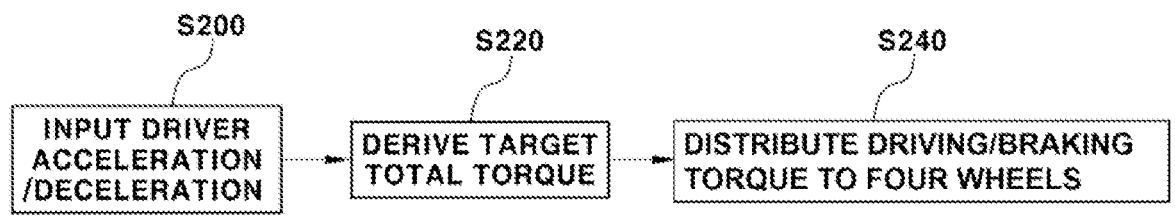
FIG. 5A is a flowchart of a general torque distribution mode.

Then the estimation method according to various exemplary embodiments of the present invention may enter the active torque distribution mode for estimating the maximum road friction coefficient (S30). As depicted in FIG. 5A, when a driver accelerates the vehicle or brakes in a torque distribution mode (S200) where the active torque distribution for estimating the maximum road friction coefficient is not performed, the processor 40 may determine a target total torque (S220). Based on the target total torque, the processor 40 distributes driving or braking torque to four wheels (S240). That is, the present case corresponds to the general torque distribution mode of FIG. 4. In the instant case, torque is distributed in consideration of energy efficiency and wheel stability. As an example of a braking situation, when a front motor has high efficiency, 100% of braking torque may be allocated to the front motor in consideration of efficiency. As various exemplary embodiments of the present invention, torque may be distributed to the front wheels and the rear wheels at a ratio of 2 to 1 in consideration of stability.

Figure 5B:
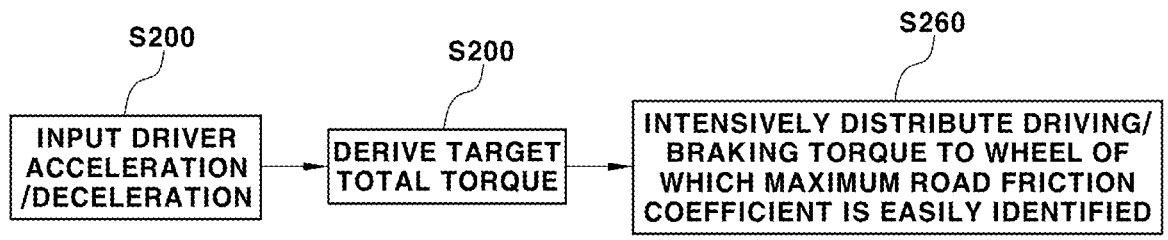
FIG. 5B is a flowchart of an active torque distribution mode.

In contrast, as shown in FIG. 5B, according to various exemplary embodiments of the present invention, when a driver accelerates the vehicle or applies a brake on the vehicle (S200), a targeted total torque may be determined (S220), which is the same operations as in FIG. 5A. What is different is that the method enters the active torque distribution mode and driving torque or braking torque may be intensively distributed for facilitating identification of the maximum road friction coefficient, (S260). That is, according to various exemplary embodiments of the present invention, the active torque distribution designed for estimating the maximum road friction coefficient is performed. As a non-limiting example, the maximum road friction coefficient may be identified by performing 100% of braking on the rear wheel to artificially cause slip of the rear wheels in a braking situation. Alternatively, the maximum road friction coefficient may be identified by performing 30% of driving of the front wheels and 130% of braking of the rear wheels to artificially cause slip of the rear wheels.

In detail, when the vehicle 1 is decelerating in the active torque distribution mode, the processor 40 may perform the active torque distribution where braking forces are differently controlled between the front wheels and the rear wheels within a range of a braking request input by the driver. That is, braking may be artificially or temporarily distributed while the total requested braking force is maintained. As a non-limiting example, braking force may be differentially distributed to the front wheels and the rear wheels. For example, 100% of the braking force may be applied only to the front wheels, and 0% of the braking force may be applied to the rear wheels. In another example, diagonal braking of the front left wheel FL and the rear right wheel RR or the front right wheel FR and the rear left wheel RL may be performed.

When the driver is accelerating the vehicle, the processor 40 may differentially control torque of the front wheels and the rear wheels while maintaining the total torque within a range of a driving request input by the driver. As a non-limiting example, driving torque may be differentially distributed to the front wheels and the rear wheels. For example, 100% of the driving torque may be distributed only to the front wheel, and 0% of the driving torque may be applied to the rear wheel. In another example, 100% of the driving torque may be applied to a main driving wheel, or 50% may be applied to a main driving wheel and simultaneously 50% may be applied to an auxiliary driving wheel.

When the vehicle 1 travels at a constant speed, the processor 40 may differentially control the braking torque and the driving torque of the front wheels and the rear wheels while keeping the torques within a range of a request for a constant speed input by the driver. That is, to maintain a constant speed, torque may be distributed between the front wheels and the rear wheels while the requested reference torque is maintained. For example, in case of independent front and rear motors, the front wheels may be driven, and the rear wheels may be controlled to perform regenerative braking. Alternatively, the front wheels and the rear wheels may be controlled such that the regenerative braking is done by the front wheels and the rear wheels are driven.

According to various exemplary embodiments of the present invention, the differential control of braking force or driving force is temporarily or artificially conducted. In other words, artificial slip of any one of the front wheels and the rear wheels is induced by differently controlling braking force or driving force of the front wheels and the rear wheels within a range of a driver's braking request, driving request, or request for a constant speed. The present generates slippage of a specific wheel, and a difference in wheel speeds between four wheels occurs.

At the present time, the processor 40 estimates force of a tire (S40). The current force of a tire $F_{tire}$ may be determined using Equation 2A below.

$$F_{tire} = \mu_c \cdot F_z \qquad (2A)$$

Here, $F_z$ indicates vertical force of the tire.

The force of a tire of each wheel may be estimated based on Equations 2B to 2E below. $F_{z,FL}$, $F_{z,FR}$, $R_{z,RL}$, $F_{z,RR}$ denote the vertical force of the front left wheel FL, the vertical force of the front right wheel FR, the vertical force of the rear left wheel RL, and the vertical force of the rear right wheel RR, respectively.

$$F_{z,FL} = F_{z,FL,nominal} - k_1 a_y - k_2 a_z \qquad (2B)$$

$$F_{z,FR} = F_{z,FR,nominal} + k_1 a_y - k_2 a_x \qquad (2C)$$

$$F_{z,RL} = F_{z,RL,nominal} - k_1 a_y + k_2 a_x \quad (2D)$$

$$F_{z,RR} = F_{z,RR,nominal} + k_1 a_y + k_2 a_x \quad (2E)$$

Here, $F_{z,FL,nominal}$, $F_{z,RF,nominal}$, $F_{z,RL,nominal}$, and $F_{z,RR,nominal}$ are nominal forces of the respective wheels, $a_x$ and $a_y$ are a longitudinal acceleration and a lateral acceleration of the vehicle, respectively, and $k_1$ and $k_2$ are certain coefficients.

At step S50, the processor 40 applies compensation of slip due to force of a tire based on the estimated force of a tire (S50). A factor corresponding to a difference in wheel speed due to a simple torque difference between the front wheels and the rear wheels is excluded, and only a difference in wheel speed due to imbalance of four wheels is extracted and reflected on the determination of the maximum road friction coefficient. Accordingly, the number of tuning variables may be minimized, and the maximum road friction coefficient may be determined promptly. If a difference in slip due to a difference in longitudinal force of a tire between front and rear sides is not taken into consideration when a difference in wheel speed between the front wheels and the rear wheels is determined, it may be difficult to accurately estimate a road friction coefficient. That is, it is difficult to determine whether the difference in wheel speed between the front wheels and the rear wheels is caused by a difference in a road friction coefficient or a difference in force of a tire, which makes it hard to accurately estimate the road friction coefficient.

An example of compensation of tire slip applied to the determination of a difference in wheel speed between the front and rear wheels is described. Suppose that a vehicle speed is 80 kilometers per hour (km/h) on a road having a high road friction coefficient (high mu). Assuming that the force of tires of the front wheels is +1,000 N, the force of tires of the rear wheels is −1,000 N, a slip ratio of the front wheels is 5%, and a slip ratio of the rear wheels is −5%, the speed of the front wheels is 84 km/h, a speed of the rear wheel is 76 km/h, and the actual difference in wheel speed is 8 kilometers per hour (km/h). According to various exemplary embodiments of the present invention, the difference in wheel speed after compensation becomes 0 with the front wheel speed of 80 km/h and the rear wheel speed of 80 km/h after compensation by compensating for an error by an absolute value of force of a tire.

In another example, a slip of 10% greater than in the above case occurs under the same force of a tire as the above case on a road having a low road friction coefficient (low mu). Then a speed of the front wheels is 88 kilometers per hour (km/h), and a speed of the rear wheels is 72 kilometers per hour (km/h). In the instant case, when the characteristics of tire slip are compensated based on the high mu, the speed of the front wheels is 84 km/h, the speed of the rear wheels is 76 km/h, and the compensated difference in wheel speed is 8 kilometers per hour (km/h). In the instant case, the road friction coefficient may be determined as a low mu.

According to various exemplary embodiments of the present invention, the characteristics of tire slip may be compensated under the assumption of a high mu. Suppose the characteristics of tire slip are compensated based on the high mu when the road status is not known, i.e., whether a road has a high mu, a middle road friction coefficient (mid mu), or a low mu. Then under input conditions of the same vertical force $F_z$ and longitudinal force $F_x$, if the road is actually a high mu road, there is no difference in wheel speed between the front wheels and the rear wheels. If the road is actually a mid mu or a low mu road, the difference in wheel speed may be further increased. That is, toward a low mu from a mid mu, the difference in wheel speed between the front wheels and the rear wheels may be gradually increased. According to various exemplary embodiments of the present invention, based on these characteristics, maximum road friction coefficients of different road states may be estimated in reference to the high mu. According to various exemplary embodiments of the present invention, a difference in wheel speed between the front wheels and the rear wheels may be determined by obtaining a reverse tire 3D map showing a relationship between a slip ratio with respect to the longitudinal force $F_x$ and the vertical force $F_z$.

In an exemplary embodiment, the high road friction coefficient is greater than the middle road friction coefficient, and the middle road friction coefficient is greater than the low road friction coefficient which is greater than or equal to a predetermined road friction coefficient.

At S60, the processor 40 may determine a wheel speed difference ratio α between the front wheels and the rear wheels with respect to the wheel speed of the front wheels and the rear wheels where tire slippage is compensated based on the high mu. The wheel speed difference ratio may be determined by determining a speed difference compensated for a yaw rate, a steering angle, a lateral speed, and a longitudinal force (S62). According to various exemplary embodiments of the present invention, the wheel speed difference ratio α between the front wheels and the rear wheels may be determined using Equation 3 below.

$$\alpha = \frac{\max(|(V_{x,FL,CG} - V_{x,RL,CG})|, |(V_{x,FR,CG} - V_{x,RR,CG})|)}{V_x} \quad (3)$$

Here, $V_{x,FL,CG}$ is a compensated speed of the front left wheel FL, $V_{x,FR,CG}$ is a compensated speed of the front right wheel FR, $V_{x,RL,CG}$ is a compensated speed of the rear left wheel RL, $V_{x,RR,CG}$ is a compensated speed of the rear right wheel RR, and $V_x$ is a longitudinal speed of a vehicle. In particular, $V_{x,FL,CG}$, $V_{x,FR,CG}$, $V_{x,RL,CG}$, and $V_{x,RR,CG}$ are respective wheel speeds of the four wheels obtained by compensating slip due to force of tires to measured wheel speeds of the wheels and a lateral speed, a steering angle, a yaw rate, and the like based on a center of gravity (CG) point of a vehicle.

With reference to FIGS. 6A to 6E, step S62 of determining the wheel speeds obtained by compensating the steering angle, the lateral speed, and the yaw rate will be described.

Equations (4) to (15) are relational expressions of wheel speed and vehicle speed when no wheel slip is present, and Equations (16) to (20b) are relational expressions on which longitudinal wheel slip is reflected.

Figure 6A:
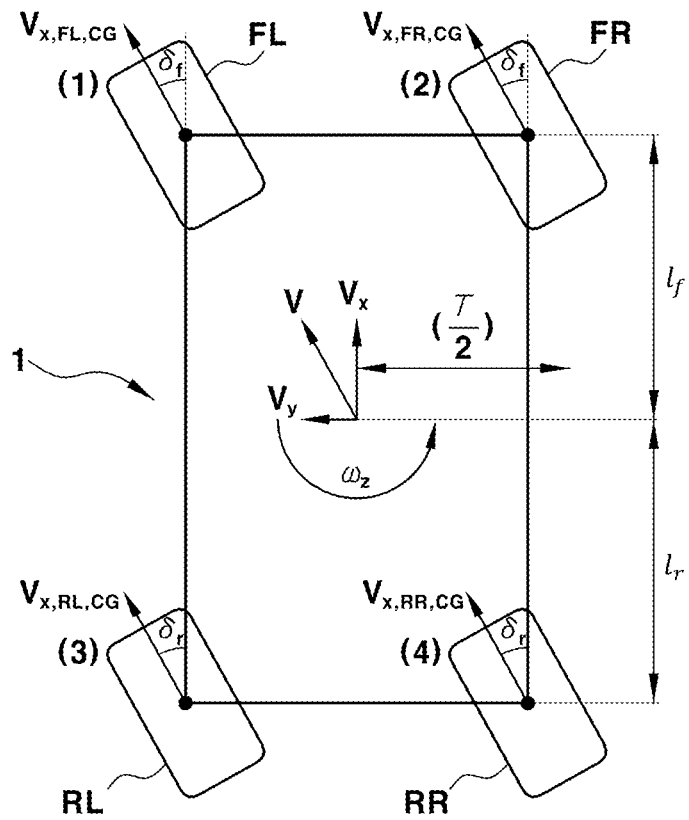
FIG. 6A is a schematic diagram showing a vehicle for deriving a relationship between wheel speed and vehicle speed.
Figure 6B:
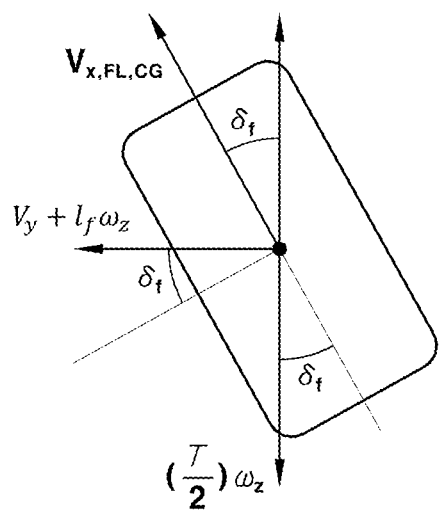
FIG. 6B is a diagram showing a front left wheel of the vehicle of FIG. 6A.

In FIG. 6A, $\delta_f$ is a front steering angle, $\delta_r$ is a rear steering angle, $l_f$ is a forward distance from the center of gravity of the vehicle, $l_r$ is a rearward distance from the center of gravity of the vehicle, T is a tread, $\omega_z$ is a yaw rate, and $V_y$ is a lateral speed, Referring to FIG. 6B, a measured wheel speed $V_{whl,FL}$ of the front left wheel FL may be determined using Equation 4 below.

$$V_{whl,FL} = V_{x,FL,CG} \cos\delta_f - \left(\frac{T}{2}\right)\omega_z \cos\delta_f + l_f \omega_z \sin\delta_f + V_y \sin\delta_f \quad (4)$$

Equation 5 below may be determined by dividing both sides of Equation 4 by $\cos\delta_f$.

$$V_{x,FL,CG} = \frac{V_{whl,FL}}{\cos\delta_f} + \left(\frac{T}{2}\right)\omega_z - l_f\omega_z\tan\delta_f - V_y\tan\delta_f \quad (5)$$

If $\delta_f \approx 0$, Equation 6 below may be obtained.

$$V_{x,FL,CG} = V_{whl,FL} + \left(\frac{T}{2}\right)\omega_z - l_f\omega_z\delta_f - V_y\delta_f \quad (6)$$

Figure 6C:
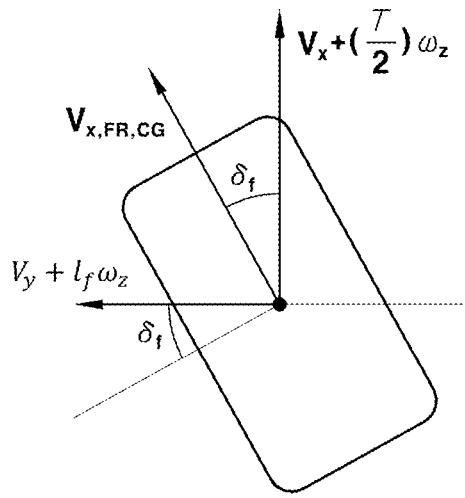
FIG. 6C is a diagram showing a front right wheel of the vehicle of FIG. 6A.

Referring to FIG. 6C, a measured wheel speed $V_{whl,FR}$ of the front right wheel FR may be determined using Equation 7 below.

$$V_{whl,FR} = V_{x,FR,CG}\cos\delta_f + \left(\frac{T}{2}\right)\omega_z\cos\delta_f + l_f\omega_z\sin\delta_f + V_y\sin\delta_f \quad (7)$$

Equation 8 below may be determined in the same way as Equation 5.

$$V_{x,FR,CG} = \frac{V_{whl,FR}}{\cos\delta_f} - \left(\frac{T}{2}\right)\omega_z - l_f\omega_z\tan\delta_f - V_y\tan\delta_f \quad (8)$$

If $\delta_f \approx 0$, Equation 9 below may be obtained.

$$V_{x,FR,CG} = V_{whl,FR} - \left(\frac{T}{2}\right)\omega_z - l_f\omega_z\delta_f - V_y\delta_f \quad (9)$$

Figure 6D:
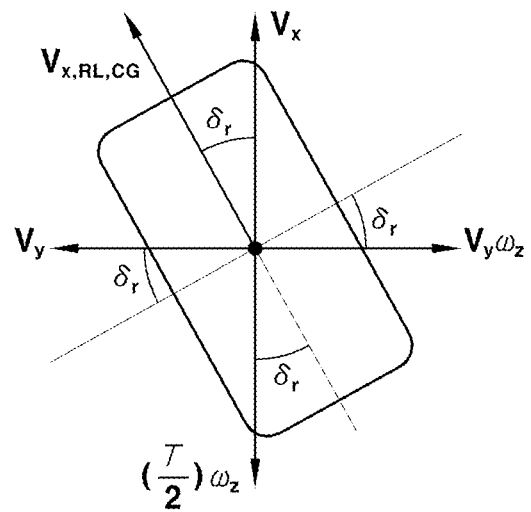
FIG. 6D is a diagram showing a rear left wheel of the vehicle of FIG. 6A.

Referring to FIG. 6D, a measured wheel speed $V_{whl,RL}$ of the rear left wheel RL may be acquired using Equation 10 below, and if $\delta_f \approx 0$, Equation 12 below may be obtained.

$$V_{whl,FR} = V_{x,RL,CG}\cos\delta_r - \left(\frac{T}{2}\right)\omega_z\cos\delta_r - l_r\omega_z\sin\delta_r + V_y\sin\delta_r \quad (10)$$

$$V_{x,RL,CG} = \frac{V_{whl,RL}}{\cos\delta_r} + \left(\frac{T}{2}\right)\omega_z + l_r\omega_z\tan\delta_r - V_y\tan\delta_r \quad (11)$$

$$V_{x,RL,CG} = V_{whl,RL} + \left(\frac{T}{2}\right)\omega_z - l_r\omega_z\delta_r - V_y\delta_r \quad (12)$$

Figure 6E:
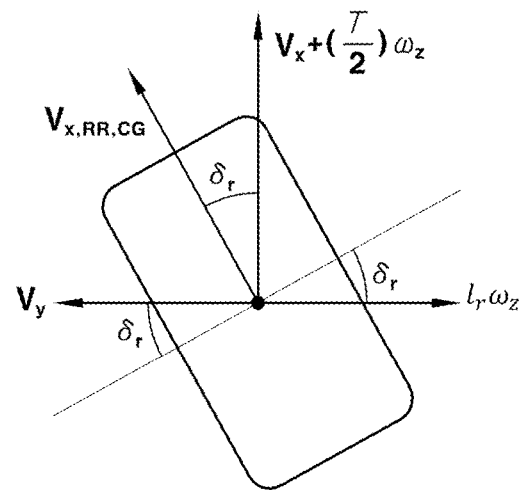
FIG. 6E is a diagram showing a rear right wheel of the vehicle of FIG. 6A.

Referring to FIG. 6E, a measured wheel speed $V_{whl,RR}$ of the rear right wheel RR may be obtained using Equation 13 below, and if $\delta_f \approx 0$, Equation 15 below may be obtained.

$$V_{whl,RR} = V_{x,RR,CG}\cos\delta_r - \left(\frac{T}{2}\right)\omega_z\cos\delta_r - l_r\omega_z\sin\delta_r + V_y\sin\delta_r \quad (13)$$

$$V_{x,RL,CG} = \frac{V_{whl,RR}}{\cos\delta_r} - \left(\frac{T}{2}\right)\omega_z + l_r\omega_z\tan\delta_r - V_y\tan\delta_r \quad (14)$$

$$V_{x,RL,CG} = V_{whl,RR} - \left(\frac{T}{2}\right)\omega_z - l_r\omega_z\delta_r - V_y\delta_r \quad (15)$$

When there is a longitudinal wheel slip, a relationship between a measured wheel speed and a positional vehicle speed at each wheel may be determined as follows. An example will be described in terms of the front left wheel FL.

The measured wheel speed of each wheel while driving is greater than the positional vehicle speed at each wheel by a slip ratio $\lambda$.

For instance, in a rectilinear motion of the vehicle, when the slip ratio $\lambda$ is 10%, a measured wheel speed of the front left wheel is 70 km/h and a positional vehicle speed at the front left wheel is 63 km/h, the positional vehicle speed at the front left wheel may be determined by multiplying the measured wheel speed of the front left wheel by (1−0.1).

In contrast, when braking, a measured wheel speed of each wheel may be smaller than a positional vehicle speed at each wheel by a slip ratio $\lambda$. In the same condition as above, that is, the positional vehicle speed of the front left wheel may be determined by dividing the measured wheel speed of the front left wheel by (1−0.1).

A compensated wheel speed for each wheel may be determined using Equations (18a) to (21b) for driving and braking situations, respectively. In Equations (18a) to (21b) below, k is a certain coefficient as a reflector of a slip ratio, and $\lambda$ is the slip ratio. Equations (18a), (19a), (20a), and (21a) are for the driving situations, and Equations (18b), (19b), (20b), and (21b) are for the braking situations.

$$V_{x,FL,CG} = \frac{V_{whl,FL}}{\cos\delta_f}(1-k\lambda) + \left(\frac{T}{2}\right)\omega_z - l_f\omega_z\tan\delta_f - V_y\tan\delta_f \quad (18a)$$

$$V_{x,FL,CG} = \frac{V_{whl,FL}}{(1-k\lambda)\cos\delta_f} + \left(\frac{T}{2}\right)\omega_z - l_f\omega_z\tan\delta_f - V_y\tan\delta_f \quad (18b)$$

$$V_{x,FR,CG} = \frac{V_{whl,FR}}{\cos\delta_f}(1-k\lambda) - \left(\frac{T}{2}\right)\omega_z - l_r\omega_z\tan\delta_f - V_y\tan\delta_f \quad (19a)$$

$$V_{x,FR,CG} = \frac{V_{whl,FL}}{(1-k\lambda)\cos\delta_f} - \left(\frac{T}{2}\right)\omega_z - l_f\omega_z\tan\delta_f - V_y\tan\delta_f \quad (19b)$$

$$V_{x,RL,CG} = \frac{V_{whl,RL}}{\cos\delta_r}(1-k\lambda) + \left(\frac{T}{2}\right)\omega_z + l_r\omega_z\tan\delta_r - V_y\tan\delta_r \quad (20a)$$

$$V_{x,RL,CG} = \frac{V_{whl,RL}}{(1-k\lambda)\cos\delta_r} + \left(\frac{T}{2}\right)\omega_z + l_r\omega_z\tan\delta_r - V_y\tan\delta_r \quad (20b)$$

$$V_{x,RR,CG} = \frac{V_{whl,RR}}{\cos\delta_r}(1-k\lambda) - \left(\frac{T}{2}\right)\omega_z + l_r\omega_z\tan\delta_r - V_y\tan\delta_r \quad (21a)$$

$$V_{x,RR,CG} = \frac{V_{whl,RR}}{(1-k\lambda)\cos\delta_r} - \left(\frac{T}{2}\right)\omega_z + l_r\omega_z\tan\delta_r - V_y\tan\delta_r \quad (21b)$$

Accordingly, depending on the presence or absence of wheel ship, a wheel speed difference ratio $\alpha$ may be determined by $V_{x,FL,CG}$, $V_{x,FR,CG}$, $V_{x,RL,CG}$, and $V_{x,RR,CG}$ to Equation 3.

The current acceleration at the maximum value of the current road friction coefficient of each wheel may be determined (S70), and the processor 40 may estimate a maximum road friction coefficient based on the wheel speed difference ratio $\alpha$ and the current road friction coefficient of each wheel (S80).

The processor 40 may determine whether the current longitudinal driving state of the vehicle 1 is a normal state of S84, like constant-speed driving, constant acceleration or deceleration, or an excessive state of S86, like a state of frequent changes in acceleration and deceleration (S82). To determine the maximum road friction coefficient, Equation 22 may be used in the normal state. The excessive state may be where a derivative value of a difference in wheel speed is great and the maximum road friction coefficient may be determined by applying Equation 23.

In the normal state, the maximum road friction coefficient may be determined by adding a preset additional friction coefficient factor $\Delta\mu_x$ corresponding to the additional frictional force which may be generated, to the current acceleration corresponding to the currently used frictional force (coefficient), the maximum value $\max(\mu_{FL},\mu_{FR},\mu_{RL},\mu_{RR})$ of the current road friction coefficient of each wheel among four wheels.

$$\mu_{peak}=\max(\mu_{FL},\mu_{FR},\mu_{RL},\mu_{RR})+\Delta\mu_x \quad (22)$$

Figure 7:
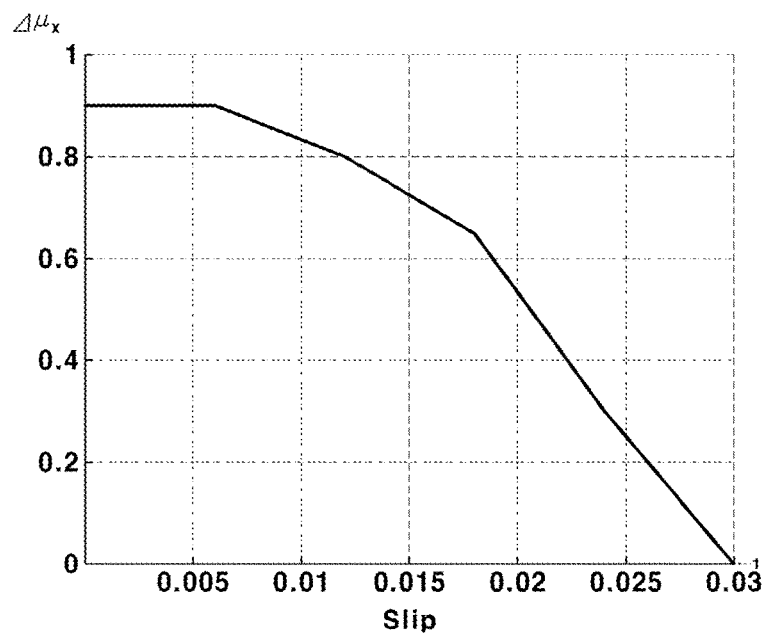
FIG. 7 is a graph showing change in an additional friction coefficient factor with respect to a difference in wheel speed between the front wheel and the rear wheel.

Here, the additional friction coefficient factor $\Delta\mu_x$ may be determined based on the wheel speed difference ratio α between the front wheels and the rear wheels in which a slip ratio is compensated. As shown in FIG. 7, when a corresponding wheel speed difference or a wheel speed difference ratio are great, this means that an additional friction coefficient is small, and when the corresponding wheel speed difference is small, this means that the additional friction coefficient is great. $\Delta\mu_x$ may be provided in a form of a lookup table based on a difference in wheel speed between the front wheels and the rear wheels.

In contrast, in the excessive state, the maximum road friction coefficient may be estimated as the maximum value of the current road friction coefficient of each of the four wheels at the current acceleration like in Equation 23.

$$\mu_{peak}=\max(\mu_{FL},\mu_{FR},\mu_{RL},\mu_{RR}) \quad (23)$$

Figure 8:
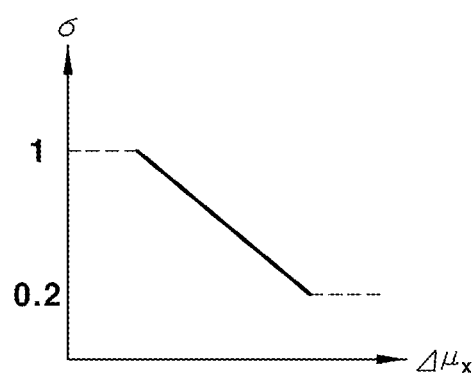
FIG. 8 is a graph showing association between an additional friction coefficient factor and a reliability index.

The additional friction coefficient factor $\Delta\mu_x$ may have an association with a reliability signal of the estimated maximum road friction coefficient in S88 of FIG. 3. As shown in FIG. 8, the reliability signal of the estimated maximum road friction coefficient and the additional friction coefficient factor $\Delta\mu_x$ may be inversely proportional to each other. That is, when the additional friction coefficient factor $\Delta\mu_x$ is great, this means that the reliability of the estimated maximum road friction coefficient is low. When the additional friction coefficient factor $\Delta\mu_x$ is small, this means that the reliability of the estimated maximum road friction coefficient is high.

As a non-limiting example, the longitudinal normal state may be activated when the following four conditions are satisfied.

(Condition 1) Absolute value of longitudinal jerk<0.045 g/second
(Condition 2) Deactivate ESC, ABS, and TCS
(Condition 3) Longitudinal speed>speed of 4 meters per second (m/s)
(Condition 4) yaw rate<20°/second As a non-limiting example, a trigger condition of the longitudinal excessive state may be the state in which Conditions 5 and 6 are satisfied. Additionally, activation of ABS, ESC, or TCS may be a condition for the trigger condition.

(Condition 5) Change rate of wheel speed difference ratio between front wheels and rear wheels>0.3/second
(Condition 6) longitudinal speed>speed of 4 m/s
(Condition 7) Activation of ESC, ABS, or TCS Accordingly, the maximum road friction coefficient $\mu_{peak}$ in a normal state and an excessive state and an estimation reliability index a of the maximum road friction coefficient may be determined.

The estimated maximum road friction coefficient may be transmitted to a vehicle control system, such as an ADAS system. The vehicle control system may control the vehicle 1 based on the estimated maximum road friction coefficient. At step S100, as a non-limiting example, in case of a stability control device, a target vehicle behavior, a wheel slip ratio, or the like may be determined again based on the maximum road friction coefficient. As another non-limiting example, a crash safety control device may determine a deceleration time or an avoidance steering time again based on the estimated maximum road friction coefficient.

As shown in FIG. 8, when the additional friction coefficient factor $\Delta\mu_x$ is 1 in a longitudinal normal state, an estimation reliability index a of the maximum road friction coefficient may be 0.2. When the additional friction coefficient factor $\Delta\mu_x$ is 0, the estimation reliability index σ of the maximum road friction coefficient may be 1. As a non-limiting example, $1/\Delta\mu_x$ may be normalized to 0.2 to 1 for use in a normal state.

When a maximum road friction coefficient is determined in the longitudinal excessive state, the estimation reliability index σ may be 1. When the longitudinal excessive state is cleared, the estimation reliability index σ of the maximum road friction coefficient determined in the excessive state condition may be 0. When the additional friction coefficient factor $\Delta\mu_x$ is small, this means that a road limit is approximately reached. Reaching the road limit means that the estimated maximum road friction coefficient is more reliable.

According to various exemplary embodiments of the present invention, when a current road is determined to be slippery through reliable estimation of a maximum road friction coefficient, a time to start braking for crash avoidance may be changed to an earlier time, or the time to intervene in steering avoidance may be changed to an earlier time than in the conventional case. Since it is necessary to secure an additional braking distance to be provided for the situation in which a preceding vehicle suddenly brakes, a crash may be avoided by setting the distance to the preceding vehicle to be longer during smart cruise control.

The present invention may be effective for chassis control. When a current road is determined to be slippery through reliable estimation of the maximum road friction coefficient, it can ensure stability by appropriately distributing driving force, braking force, or cornering force to four wheels in advance. Furthermore, braking, driving, and cornering performance and stability may be improved through early intervention of ABS, TCS, or ESC.

Various aspects of the present invention are directed to providing excellent performance for estimating a maximum road friction coefficient using a vehicle sensor.

The present invention can provide logic for estimating a maximum road friction coefficient associated with torque control for each wheel based on the characteristics of a vehicle to which in-wheel or by-wire technology is applied.

According to various exemplary embodiments of the present invention, chassis control performance may be improved through reliable estimation of the maximum road friction coefficient. In particular, initial control performance of ABS, TCS, and ESC may be improved.

According to various exemplary embodiments of the present invention, ADAS control performance, such as SCC (Smart Cruise Control), AEB (Autonomous Emergency Braking), and Lane Keeping Assist System (LKAS), may be improved through reliable estimation of the maximum road friction coefficient. For example, the present invention may be used to set the distance between vehicles or to set a time of operating AEB to which the maximum road friction coefficient is applied.

According to various exemplary embodiments of the present invention, the stability of an autonomous vehicle may be ensured and the limit performance may be improved through reliable estimation of the maximum road friction coefficient.

The present invention may provide a method of estimating a maximum road friction coefficient for providing a reliable maximum road friction coefficient.

Furthermore, the term related to a control device such as "controller", "control unit", "control device" or "control module", etc refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present invention. The control device according to exemplary embodiments of the present invention may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors. The processor may include various logic circuits and operation circuits, may process data according to a program provided from the memory, and may generate a control signal according to the processing result.

The control device may be at least one microprocessor operated by a predetermined program which may include a series of commands for carrying out the method included in the aforementioned various exemplary embodiments of the present invention.

The aforementioned invention can also be embodied as computer readable codes on a computer readable recording medium. The computer readable recording medium is any data storage device that can store data which may be thereafter read by a computer system. Examples of the computer readable recording medium include hard disk drive (HDD), solid state disk (SSD), silicon disk drive (SDD), read-only memory (ROM), random-access memory (RAM), CD-ROMs, magnetic tapes, floppy discs, optical data storage devices, etc and implementation as carrier waves (e.g., transmission over the Internet).

In various exemplary embodiments of the present invention, each operation described above may be performed by a control device, and the control device may be configured by multiple control devices, or an integrated single control device.

In various exemplary embodiments of the present invention, the control device may be implemented in a form of hardware or software, or may be implemented in a combination of hardware and software.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A method of estimating a maximum road friction coefficient, the method comprising:
   collecting, by a processor, operation information related to a vehicle;
   differentially controlling, by the processor, at least one of driving torque and braking torque of a front wheel and a rear wheel of the vehicle within a range of a driving request, a braking request, or a request to maintain a constant speed of the vehicle for estimating the maximum road friction coefficient;
   compensating, by the processor, slip due to tire force in the front wheel and the rear wheel;
   determining, by the processor, a wheel speed difference ratio of the front wheel and the rear wheel according to a speed of the front wheel and a speed of the rear wheel where the slip due to tire force is compensated; and
   estimating, by the processor, the maximum road friction coefficient according to the wheel speed difference ratio and a current road friction coefficient of each wheel including the front wheel and the rear wheel,
   wherein, in determining the wheel speed difference ratio, a speed of each wheel is compensated for a steering angle, a yaw rate, and a lateral speed of the vehicle, and
   wherein the wheel speed difference ratio is determined based on the speed of each wheel compensated for the slip due to tire force, the lateral speed, the steering angle, and the yaw rate of the vehicle based on a center of gravity of the vehicle and a longitudinal speed of the vehicle.

2. The method of claim 1, wherein the operation information includes the yaw rate, the steering angle, a longitudinal acceleration and a lateral acceleration of the vehicle, and wheel speed and torque of each wheel.

3. The method of claim 1, further including:
   estimating, by the processor, tire force of each wheel before the slip due to tire force of each wheel is compensated.

4. The method of claim 3, wherein the tire force of each wheel is determined according to a longitudinal acceleration and a lateral acceleration of the vehicle, and a nominal force of each wheel.

5. The method of claim 1, wherein the slip due to tire force is compensated with an assumption that a road where the vehicle is traveling has a high friction coefficient which is greater than a predetermined friction coefficient.

6. The method of claim 1,
   wherein the front wheel includes a front left wheel and a front right wheel, and the rear wheel includes a rear left wheel and a rear right wheel, and
   wherein the wheel speed difference ratio $\alpha$ of the front wheel and the rear wheel is determined using a following equation:

$$\alpha = \frac{\max(|(V_{x,FL,CG} - V_{x,RL,CG})|, |(V_{x,FR,CG} - V_{x,RR,CG})|)}{V_x}$$

where $V_{x,FL,CG}$, $V_{x,FR,CG}$, $V_{x,RL,CG}$, and $V_{x,RR,CG}$ are a speed of the front left wheel, a speed of the front right wheel, a speed of the rear left wheel, and a speed of the rear right wheel, compensated for the slip due to tire force, the lateral speed, the steering angle, and the yaw rate of the vehicle, respectively, and $V_x$ is the longitudinal vehicle speed of the vehicle.

7. The method of claim 6, wherein, when there is no longitudinal wheel slip, the speed of the front left wheel, the speed of the front right wheel, the speed of the rear left wheel, and the speed of the rear right wheel, compensated for the slip due to tire force, the lateral speed, the steering angle, and the yaw rate based on the center of gravity of the vehicle, are determined using following equations:

$$V_{x,RL,CG} = \frac{V_{whl,FL}}{\cos\delta_f} + \left(\frac{T}{2}\right)\omega_z + l_f\omega_z\tan\delta_f - V_y\tan\delta_f$$

$$V_{x,FR,CG} = \frac{V_{whl,FR}}{\cos\delta_f} - \left(\frac{T}{2}\right)\omega_z - l_f\omega_z\tan\delta_f - V_y\tan\delta_f$$

$$V_{x,RL,CG} = \frac{V_{whl,RL}}{\cos\delta_r} + \left(\frac{T}{2}\right)\omega_z + l_r\omega_z\tan\delta_r - V_y\tan\delta_r$$

$$V_{x,RR,CG} = \frac{V_{whl,RR}}{\cos\delta_r} - \left(\frac{T}{2}\right)\omega_z + l_r\omega_z\tan\delta_r - V_y\tan\delta_r$$

where $V_{whl,FL}$, $V_{whl,FR}$, $V_{whl,RL}$ and $V_{whl,RR}$ are measured wheel speeds of the front left wheel, the front right wheel, the rear left wheel, and the rear right wheel, respectively, $\delta_f$ is a front steering angle, $\delta_r$ is a rear steering angle, $l_f$ is a forward distance from the center of gravity of the vehicle, $l_r$ is a rearward distance from the center of gravity of the vehicle, T is a tread, $\omega_z$ is the yaw rate, and $V_y$ is the lateral speed.

8. The method of claim 6, wherein, when there is longitudinal wheel slip and driving torque is applied, the speed of the front left wheel, the speed of the front right wheel, the speed of the rear left wheel, and the speed of the rear right wheel, compensated for the slip due to tire force, the lateral speed, the steering angle, and the yaw rate based on the center of gravity of the vehicle, are determined using following equations:

$$V_{x,FL,CG} = \frac{V_{whl,FL}}{\cos\delta_f} + \left(\frac{T}{2}\right)\omega_z - l_f\omega_z\tan\delta_f - V_y\tan\delta_f$$

$$V_{x,FR,CG} = \frac{V_{whl,FR}}{\cos\delta_f}(1-k\lambda) - \left(\frac{T}{2}\right)\omega_z - l_f\omega_z\tan\delta_f - V_y\tan\delta_f$$

$$V_{x,RL,CG} = \frac{V_{whl,RL}}{\cos\delta_r}(1-k\lambda) + \left(\frac{T}{2}\right)\omega_z + l_r\omega_z\tan\delta_r - V_y\tan\delta_r$$

$$V_{x,RR,CG} = \frac{V_{whl,RR}}{\cos\delta_r}(1-k\lambda) - \left(\frac{T}{2}\right)\omega_z + l_r\omega_z\tan\delta_r - V_y\tan\delta_r$$

where $V_{whl,FL}$, $V_{whl,FR}$, $V_{whl,RL}$ and $V_{whl,RR}$ are measured wheel speeds of the front left wheel, the front right wheel, the rear left wheel, and the rear right wheel, respectively, $\delta_f$ is a front steering angle, $\delta_r$ is a rear steering angle, $l_f$ is a forward distance from the center of gravity of the vehicle, $l_r$ is a rearward distance from the center of gravity of the vehicle, T is a tread, $\omega_z$ is the yaw rate, $V_y$ is the lateral speed, $\lambda$ is a slip ratio, and k is a coefficient as a reflector of the slip ratio.

9. The method of claim 6, wherein, when there is longitudinal wheel slip and braking torque is applied, the speed of the front left wheel, the speed of the front right wheel, the speed of the rear left wheel, and the speed of the rear right wheel, compensated for the slip due to tire force, the lateral speed, the steering angle, and the yaw rate based on the center of gravity of the vehicle, are determined using following equations:

$$V_{x,FL,CG} = \frac{V_{whl,FL}}{(1-k\lambda)\cos\delta_f} + \left(\frac{T}{2}\right)\omega_z - l_f\omega_z\tan\delta_f - V_y\tan\delta_f$$

$$V_{x,FR,CG} = \frac{V_{whl,FR}}{(1-k\lambda)\cos\delta_f} - \left(\frac{T}{2}\right)\omega_z - l_f\omega_z\tan\delta_f - V_y\tan\delta_f$$

$$V_{x,RL,CG} = \frac{V_{whl,RL}}{(1-k\lambda)\cos\delta_r} + \left(\frac{T}{2}\right)\omega_z + l_r\omega_z\tan\delta_r - V_y\tan\delta_r$$

$$V_{x,RR,CG} = \frac{V_{whl,RR}}{(1-k\lambda)\cos\delta_r} - \left(\frac{T}{2}\right)\omega_z + l_r\omega_z\tan\delta_r - V_y\tan\delta_r$$

where $V_{whl,FL}$, $V_{whl,FR}$, $V_{whl,RL}$ and $V_{whl,RR}$ are measured wheel speeds of the front left wheel, the front right wheel, the rear left wheel, and the rear right wheel, respectively, $\delta_f$ is a front steering angle, $\delta_r$ is a rear steering angle, $l_f$ is a forward distance from the center of gravity of the vehicle, $l_r$ is a rearward distance from the center of gravity of the vehicle, T is a tread, $\omega_z$ is the yaw rate, $V_y$ is the lateral speed, $\lambda$ is a slip ratio, and k is a coefficient as a reflector of the slip ratio.

10. The method of claim 1, wherein determining the maximum road friction coefficient includes:
determining the maximum road friction coefficient adding a maximum value of the current road friction coefficient of each wheel to an additional friction coefficient factor by adding a maximum value of the current road friction coefficient of each wheel to an additional friction coefficient factor determined according to the wheel speed difference ratio.

11. The method of claim 10, wherein, when a change rate of the wheel speed difference ratio is greater than a preset threshold value, a current state of the vehicle is determined as an excessive state, and a maximum road friction coefficient in the excessive state is determined as a maximum value of the current road friction coefficient of each wheel.

12. The method of claim 10, wherein, when a change rate of the wheel speed difference ratio is equal to or less than a preset threshold value, a current state of the vehicle is determined as a normal state, and a maximum road friction coefficient in the normal state is obtained by adding a maximum value of the current road friction coefficient of each wheel to an additional friction coefficient factor determined according to the wheel speed difference ratio.

13. The method of claim 1, further including determining a reliability index of the estimated maximum road friction coefficient.

14. The method of claim 13, wherein determining of the reliability index includes classifying a driving state of the vehicle into a normal state and an excessive state according to the wheel speed difference ratio and a change rate of the wheel speed difference ratio and determining an estimated reliability index for each of the normal state and excessive state.

15. The method of claim 14, wherein the normal state is determined based on an absolute value of longitudinal jerk, the longitudinal speed, and the yaw rate of the vehicle, and whether an electronic stability control (ESC) device, an anti-lock brake system (ABS), or a traction control system (TCS) is activated.

16. The method of claim 14, wherein the excessive state is determined based on the change rate of the wheel speed difference ratio between the front wheel and the rear wheel and the longitudinal speed of the vehicle.

17. A non-transitory computer readable storage medium on which a program for performing the method of claim 1 is recorded.

* * * * *